United States Patent [19]
Vogl et al.

[11] Patent Number: 5,868,983
[45] Date of Patent: Feb. 9, 1999

[54] SURFACE FINISHING OF SHEETS MADE FROM THERMOPLASTICS

[75] Inventors: Herbert Vogl; Jürgen Röhner, both of Köln, Germany; Jürgen Hättig, Hong Kong, Hong Kong

[73] Assignee: Bayer Aktiengesellschaft, Germany

[21] Appl. No.: 956,851

[22] Filed: Oct. 23, 1997

[30] Foreign Application Priority Data

Oct. 30, 1996 [DE] Germany .................. 196 43 828.4

[51] Int. Cl.$^6$ .................. B05D 1/12; B29C 47/06
[52] U.S. Cl. .................. 264/131; 264/171.13; 264/173.1; 264/211.12; 427/180; 427/365
[58] Field of Search .................. 264/131, 171.13, 264/173.1, 211.12; 427/180, 365

[56] References Cited

FOREIGN PATENT DOCUMENTS 2 246 523   9/1993   United Kingdom .

OTHER PUBLICATIONS

Patent Abstracts of Japan, vol. 015, No. 396 (M–1166) Oct. 8, 1991 & JP 03 161329 A (Toyoda Gosei Co. Ltd.) Jul. 11, 1991.

Database WPI Section Ch. Week 9350, Derwent Publications Ltd., London, GB & JP 05 302 062 A (Dainippon Ink & Chem KK) Nov. 16, 1993.

Patent Abstacts of Japan, vol. 096, No. 011, Nov. 29, 1996 & JP 08 179780 (Nissan Motor Co Ltd), Jul. 12, 1996.

*Primary Examiner*—Leo B. Tentoni
*Attorney, Agent, or Firm*—Connolly & Hutz

[57] ABSTRACT

The present invention provides a process for surface finishing sheets made from thermoplastics by applying a partially fused layer of thermoplastic polyurethane.

3 Claims, 1 Drawing Sheet

SURFACE FINISHING OF SHEETS MADE FROM THERMOPLASTICS

BACKGROUND OF THE INVENTION

The present invention provides a process for surface finishing sheets made from thermoplastics. Such sheets are generally produced by extruding the plastic through slot dies. The extrudate leaving the die is usually passed while still hot through two to four polishing calender rolls.

SUMMARY OF THE INVENTION

It has been found that the surface of such extruded sheets may be finished by sprinkling spherical thermoplastic polyurethane pellets onto the still hot sheets immediately after they leave the slot die, allowing the pellets partially to fuse and pressing them into the plastic surface under their own weight and/or pressure from the polishing calender rolls. In this manner, a rough surface is obtained in which the small spherical thermoplastic polyurethane pellets are still visible and may be felt as elevated points.

Suitable sheet materials are in principle any melt processable plastics. Polystyrene, impact-resistant polystyrene, ABS, unplasticised PVC, TPU, polycarbonate or polypropylene are preferred. The coating material used preferably comprises conventional commercial thermoplastic polyurethanes in the form of conventional commercial spherical pellets having particles of a diameter of approx. 0.3 to approx. 5 mm, or cylindrical pellets, lenticular pellets, diced pellets of a diameter or edge length of approx. 1 to 6 mm.

BRIEF DESCRIPTION OF THE DRAWINGS

The process is illustrated by way of example in FIG. 1. In this Figure, 1 denotes the slot die attached to an extruder, 2 the plastic sheet leaving the die, 3 a feed apparatus for the thermoplastic polyurethane pellets, 4 the calender rolls and 5 thermally insulating guide plates.

DETAILED DESCRIPTION OF THE INVENTION

The thermoplastic polyurethane pellets 3 are sprinkled onto the plastic sheet 2 immediately once it has left the slot die 1. At this time, the extrudate is still hot, being still virtually at the extrusion temperature. Depending upon the plastic, this temperature is approx. 180° to 280° C. This temperature is sufficient partially to fuse the applied polyurethane pellets (melting point some 180° C.), such that a coating is formed which may range from separate particles to a continuous surface, with the grains, however, still remaining visible and perceptible as elevated points. The sheet is then passed through the polishing calender rolls, wherein the thermoplastic polyurethane grains are gently pressed into the surface of the plastic. In this manner, a permanent bond is created.

Figure 1:
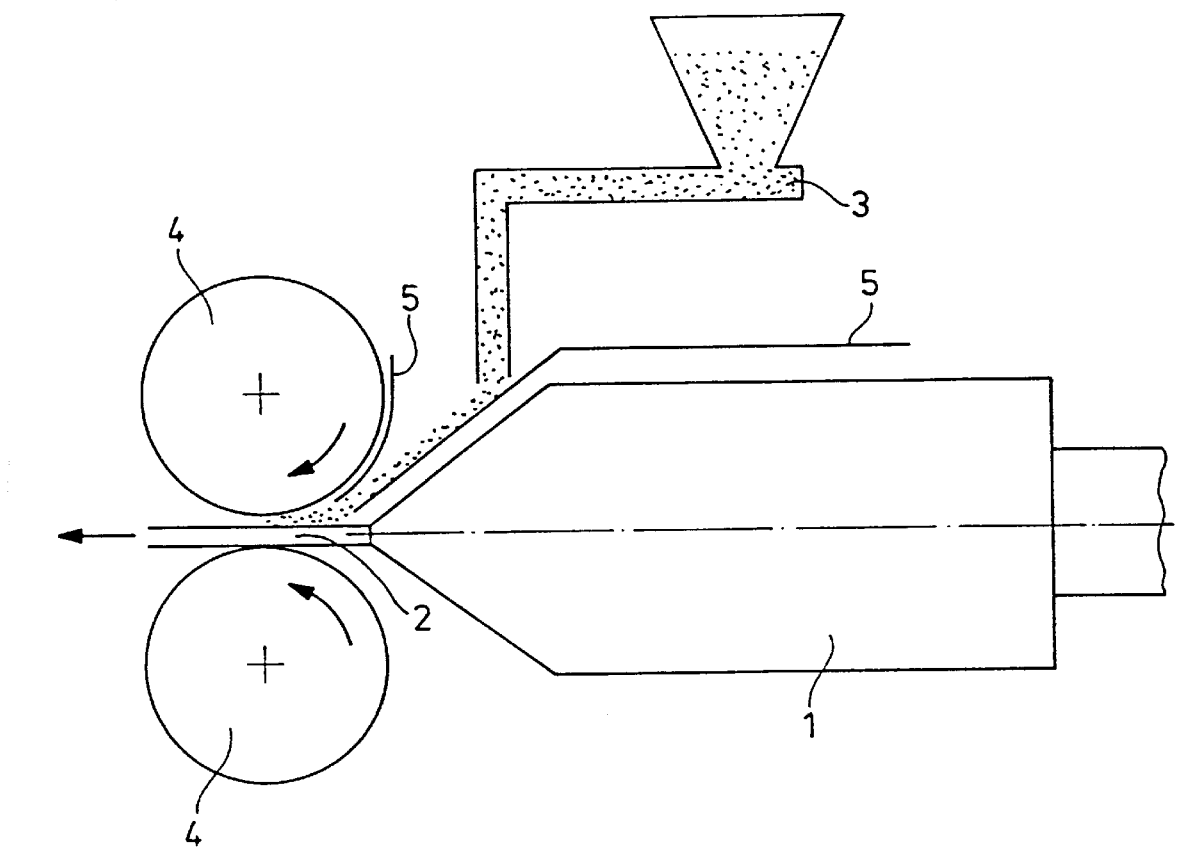
Figure 2:
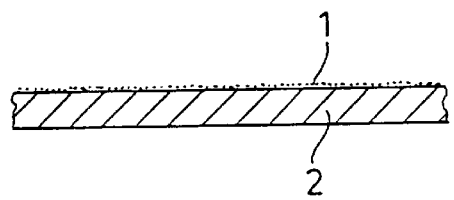
FIGS. 2 and 3 are schematic views of a sheet.
Figure 3:
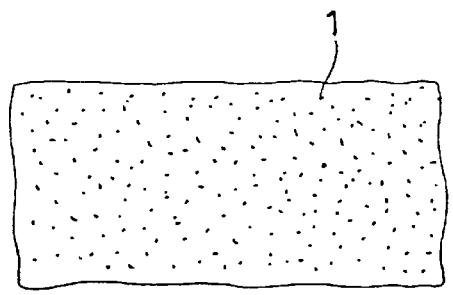

The finished sheet is shown schematically in FIG. 2 (side view) and FIG. 3 (top view). In these Figures, 1 denotes the introduced polyurethane pellets and 2 the base material of the sheet.

It is possible according to the invention to provide any plastic sheet with a finished surface. This surface may perform various functions. It may thus act as a non-slip coating for floor coverings, conveying equipment components or thermoformed consumer articles (shower trays, suitcase shells, storage space liners, handles). They may, however, also be used to improve scratch or wear resistance, to increase low temperature impact strength, to suppress noise and to modify the handle of the material. This coating may also have a decorative function. Colouring effects may be produced with coloured pellets or an image-wise arrangement may even be produced using a suitable sprinkling apparatus.

It is furthermore possible to use materials having hot melt adhesive properties as the thermoplastic polyurethane, such as for example Texin DP-7-1114 or Desmocoll 530, Desmocoll 540 (Bayer AG). Once reheated, the sheet may then be laminated with other materials, for example textiles, or it may be covered with fabric and, after heating, thermoformed in a single operation. Hot melt adhesives made from polyamide may also be used instead of TPU.

Practical Example

Production of solid ABS sheets with a surface finish of spherical TPU pellets.

Test Set-Up main extruder: Reifenhäuser RH 70 diameter=70 mm screw length 33 D, vented 350 mm width sheet die with choke bar and adjustable lip die gap set=5 mm 3-roll calendar, vertical roll arrangement Processing Parameters Temperature settings (° C.)

Extruder

Z1=220

Z2=220

Z3=220

Z4=230

Z5=240

Connectors=250

Die=265

Materials Used

Conventional commercial ABS (Novodur P2KE, natural, Bayer AG)

Spherical thermoplastic polyurethane pellets (Texin DP-7-1114, spherical pellets, natural, sphere diameter approx. 0.6–0.8 mm, Bayer AG)

Sheet Dimensions

Width=350 mm

Thickness=4 mm

| Parameters | |
| --- | --- |
| Melt pressure, bar | 142 |
| Temperature, °C. | 257 |
| Rotational speed, 1/min | 51 |
| Current, A | 50 |
| Roll temperature | top 70° C. |
| | middle = 50° C. |
| | bottom = 70° C. |

Total throughput: approx. 50 kg/h, spherical pellets approx. 3 kg/h

Take-Off Speed: 0.5/min

Method

A solid ABS sheet of the best possible quality without a visible bead and with no surface finish was initially produced. The roll nip settings were then widened by a further 0.3 mm.

The spherical TPU pellets were without pretreatment applied uniformly onto the melt by means of a vibrating chute and feed plates. The pellet feed rate was adjusted by means of the intensity of vibration of the chute such that 49 g of spherical pellets per minute were applied onto an approximately semi-continuous sheet surface (approx. 55 pellets/cm$^2$).

The guide plates are sufficiently insulated that they are not heated by the radiant heat from the melt or calendar rolls, so that uniform pellet feed is not disrupted by partial melting.

A storage space liner for a car dashboard is shaped from the sheet coated in this manner.

| Surface temperature: 160° C. | Heating time: 90 sec |
| Mould temperature: 80° C. | Cooling time: 60 sec |

The storage space liner produced in this manner provides very good noise suppression and scratch protection when metal articles, such as coins, keys, cigarette lighters are stored thereon, and non-slip properties when beverage cans, drinking cups etc. are placed thereon.

We claim:

1. A process for finishing the surface of extruded sheets of thermoplastics during the production thereof by extrusion through slot dies, comprising the steps of extruding a thermoplastic sheet through a slot die, sprinkling spherical thermoplastic polyurethane pellets onto the still hot thermoplastic sheet immediately after the sheet leaves the slot die, allowing the pellets to partially fuse, and pressing the pellets into the thermoplastic sheet under their own weight and/or pressure from polishing calendar rolls.

2. A process as in claim 1 wherein the thermoplastic is polyurethane having hot melt adhesive properties.

3. A process as in claim 1 including the step of applying a hot melt adhesive to the thermoplastic sheet.

* * * * *